(12) United States Patent
Ubriani et al.

(10) Patent No.: US 11,483,333 B2
(45) Date of Patent: Oct. 25, 2022

(54) MACHINE LEARNING-BASED ROLE DETERMINATION FOR ACCESS CONTROL TO ENTERPRISE SYSTEMS

(71) Applicant: PRUDENT AND SWIFT DECISIONS ENTERPRISES LLP, Maharashtra (IN)

(72) Inventors: Umesh Ubriani, Pune (IN); Priyanka Rungta, Pune (IN); Ritesh Dubal, Pune (IN)

(73) Assignee: PRUDENT AND SWIFT DECISIONS ENTERPRISES LLP

( * ) Notice: Subject to any disclaimer, the term of this patent is extended or adjusted under 35 U.S.C. 154(b) by 282 days.

(21) Appl. No.: 16/894,808

(22) Filed: Jun. 7, 2020

(65) Prior Publication Data

US 2021/0314340 A1 Oct. 7, 2021

(30) Foreign Application Priority Data

Apr. 3, 2020 (IN) .............................. 202021014836

(51) Int. Cl.
| | |
|---|---|
| *H04L 9/40* | (2022.01) |
| *G06K 9/62* | (2022.01) |
| *G06F 16/242* | (2019.01) |
| *G06F 9/54* | (2006.01) |
| *G06N 20/00* | (2019.01) |
| *H04L 51/02* | (2022.01) |

(52) U.S. Cl.
CPC .......... *H04L 63/1433* (2013.01); *G06F 9/547* (2013.01); *G06F 16/243* (2019.01); *G06K 9/6256* (2013.01); *G06N 20/00* (2019.01); *H04L 51/02* (2013.01); *H04L 63/083* (2013.01); *H04L 63/102* (2013.01)

(58) Field of Classification Search
CPC . H04L 63/1433; H04L 63/083; H04L 63/102; H04L 51/02; G06N 20/00; G06F 9/547; G06K 9/6256
USPC .......................................................... 726/25
See application file for complete search history.

(56) References Cited

U.S. PATENT DOCUMENTS

| | | | |
|---|---|---|---|
| 10,482,231 B1 * | 11/2019 | Harding | ................... G06F 21/33 |
| 2018/0324215 A1 * | 11/2018 | Kalia | ........................ H04L 63/20 |
| 2018/0365439 A1 * | 12/2018 | Milman | ................ H04L 51/212 |

(Continued)

*Primary Examiner* — James E Springer
(74) *Attorney, Agent, or Firm* — Prakash Nama; Global IP Services, PLLC

(57) ABSTRACT

In one example, a computer implemented method may include receiving a request from a user to access an enterprise system and obtaining, via a chatbot, user inputs by providing at least one of interactive menu-based and natural language-based queries on a graphical user interface in response to receiving the request. Further, the method may include determining a transaction code and/or an authorization code corresponding to the request in the enterprise system by applying natural language processing and a machine learning model to the obtained user inputs. Furthermore, the method may include determining a role corresponding to the transaction code and/or the authorization code by accessing the enterprise system and performing a risk assessment for the user to access the enterprise system based on the determined role and a user profile. Further, the method may include controlling the access to the enterprise system based on the risk assessment and the determined role.

20 Claims, 18 Drawing Sheets

(56) References Cited

U.S. PATENT DOCUMENTS

2019/0266287 A1* 8/2019 Chen .................. G06F 16/3329
2021/0141865 A1* 5/2021 Machado ............. G06F 40/295

* cited by examiner

| SWAMI ACCESS URL | ⤓ |

SEAMLESS TOMORROW ≡

💬 CHAT
✓ SUCCESS
✗ FAILUR

CHAT ⊘ ❓

SWAMI FOR ACCESS MANAGEMENT

TEST SAP SERVER 1
15:45:14 03-02-2020

PLEASE SELECT THE COMPANY FOR WHICH THE ACCESS IS NEEDED?
15:45:14 03-02-2020

1234 – MANUFACTURING –USLOCATION_CUSTOMERXYZ
15:46:30 03-02-2020

PLEASE LET US KNOW THE BUSINESS PROCESS OR MODULE IN WHICH YOU ARE WORKING?
CHOOSE HERE ⌄
15:46:30 03-02-2020

| TYPE YOUR MESSAGE HERE.... | ➤ |

<u>612</u>

© 2019 PNSDLLP          POWERED BY SEAMLESS TOMORROW

MACHINE LEARNING-BASED ROLE DETERMINATION FOR ACCESS CONTROL TO ENTERPRISE SYSTEMS

RELATED APPLICATIONS

Benefit is claimed under 35 U.S.C. 119(a)-(d) to Foreign Application Serial No. 202021014836 filed in India entitled "MACHINE LEARNING-BASED ROLE DETERMINATION FOR ACCESS CONTROL TO ENTERPRISE SYSTEMS", on Apr. 3, 2020, by PRUDENT AND SWIFT DECISIONS ENTERPRISES LLP, which is herein incorporated in its entirety by reference for all purposes.

BACKGROUND

In an enterprise, multiple users use services and share various enterprise systems or resources. In such an environment, an access control mechanism may be implemented for permitting only a legally authorized user to access the enterprise system. For example, the access control mechanism may be implemented to monitor enterprise users with respect to their access rights to different enterprise systems. Further, an administrator of each department in the enterprise may manage access roles of the users in his/her department. For example, the administrator may grant access privileges to managers at different levels, including creating and limiting access to application systems, as well as manage the relationships among roles and their associated privileges.

BRIEF DESCRIPTION OF THE DRAWINGS

Examples are described in the following detailed description and in reference to the drawings, in which:

FIGS. 6A-6L depict example chatbots illustrating a combination of menu-based and natural language-based queries to obtain user inputs.

DETAILED DESCRIPTION

Figure 1A:
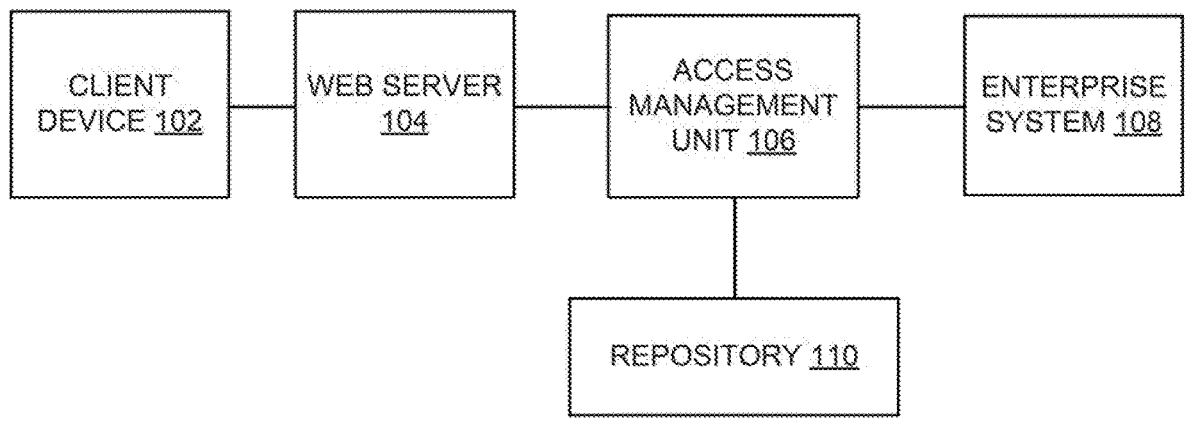
FIG. 1A is a block diagram of an example system, including an access management unit to provide access control to an enterprise system.

In computing, access control may be a process by which users can be granted access and certain privileges to enterprise systems, resources, and/or information. In such process, an administrator may manage access roles of users in the enterprise. For example, the administrator may grant access privileges to managers at different levels, including creating and limiting access to application systems, as well as manage the relationships among roles and their associated privileges. Such administrators, managers, or the like may be considered as approvers. Further, when a user requests for a new role, the concerned approver may review the request, perform analysis for user access, and segregate duties risks, and then approve, reject, or modify the request.

However, maintaining the access rights of users corresponding to many different enterprise systems up to date may be challenging. Further, the user may not be aware of how the access rights are mapped or implemented in a backend system of the enterprise. For example, a user may request for access to "create sales order", however, the user may not be aware of corresponding transaction code (e.g., the transaction code may be a key that enables to access a specific transaction in the enterprise system corresponding to the request) in the enterprise system to execute the request. As the enterprise grows, the number of transaction codes increases, hence it may be challenging to maintain the transaction codes and corresponding authorization activities in-line with organization's risk register, policies, and other restrictions. In addition, one of the challenges observed by the enterprises may be an amount of time and effort taken to provision access for the users. In such scenarios, a significant amount of the time and effort may have to be spent in manual intensive tasks such as understanding right requirement, matching the requirement to role, performing risk analysis, and approving the request.

Examples described herein may provide an access management unit to determine roles for controlling access to enterprise systems based on a machine learning approach. In one example, the access management unit may receive a request from a user to access an enterprise system, obtain, via a chatbot, user inputs by providing at least one of interactive menu-based and natural language-based queries on a graphical user interface in response to receiving the request, and determine a transaction code and/or an authorization code corresponding to the request in the enterprise system by applying natural language processing and a machine learning model on the obtained user inputs. Upon determining the transaction code and/or the authorization code, the access management unit may determine a role corresponding to the transaction code and/or the authorization code by accessing the enterprise systems. Further, the access management unit may perform a risk assessment for the user to access the enterprise system based on the determined role and a user profile. Furthermore, the access management unit may control the access to the enterprise system based on the risk assessment and the determined role.

Examples described herein may automate processing of requests in an access management process. For example, examples described herein may address the challenges in access management by being able to understand user requirements, search for the right role in the backend system, and perform risk assessment based on predefined rules (e.g. segregation of duties). Thus, examples described herein may provide an automated, secure, and authorization solution to enhance user experience in accessing the enterprise system.

In the following description, for purposes of explanation, numerous specific details are set forth in order to provide a thorough understanding of the present techniques. However, the example apparatuses, devices and systems, may be practiced without these specific details. Reference in the specification to "an example" or similar language means that a feature, structure, or characteristic described is included in at least that one example but may not be in other examples.

Turning now to the figures, FIG. 1A is a block diagram of an example system 100, including an access management unit 106 to provide access control to an enterprise system 108. Example system 100 may include a web server 104 to transmit a request from a user to access management unit 106. In one example, the request may be received from a client device 102 to access one or more enterprise systems (e.g., enterprise system 108). Example enterprise system 108 may be a cross-functional information system that provides organization-wide coordination and integration of key business processes and helps in planning the resources of an organization or enterprise. Further, enterprise system 108 can be hosted on an on-premise environment, a cloud environment, or a combination thereof. Enterprise system 108 may be referred as enterprise resource planning (ERP) system. For example, enterprise system 108 may be SAP® ERP central component (ECC), governance risk compliance (GRC), or the like.

As shown in FIG. 1A, system 100 may include access management unit 106. In one example, access management unit 106 may receive the request through client device 102 and obtain, via a chatbot, user inputs by providing at least one of interactive menu-based and natural language-based queries on a graphical user interface of client device 102 in response to receiving the request. Example chatbot is depicted in FIGS. 6A-6L.

Further, access management unit 106 may determine a transaction code and/or an authorization code corresponding to the request in the enterprise system by applying natural language processing and a machine learning model on the obtained user inputs. Further, access management unit 106 may determine a role corresponding to the transaction code and/or the authorization code by accessing enterprise system 108. In one example, access management unit 106 may connect via open data protocol (OData) services, SAP® NetWeaver Gateway, or the like to communicate and exchange information between enterprise system 108 and access management unit 106. Furthermore, access management unit 106 may perform a risk assessment for the user to access enterprise system 108 based on the determined role and a user profile in the enterprise and user's usage of the enterprise system in the past. Upon performing the risk assessment, access management unit 106 may control the access to enterprise system 108 based on the risk assessment and the determined role. Example operation of access management unit 106 is described in FIG. 1B.

Further, system 100 may include a repository 110 to record transaction logs when user 102 accesses enterprise system 108, which may be further used for auditing. Example auditing process is described in FIG. 1B.

In one example, access management unit 106 may be available in an on-premise or a cloud-based subscription model. Further, access management unit 106 may be positioned as a front end for access requirements. In some examples, the functionalities described herein, in relation to instructions to implement functions of access management unit 106, and any additional instructions described herein in relation to the storage medium, may be implemented as engines or modules including any combination of hardware and programming to implement the functionalities of the modules or engines described herein. The functions of access management unit 106 may also be implemented by a respective processor.

Figure 1B:
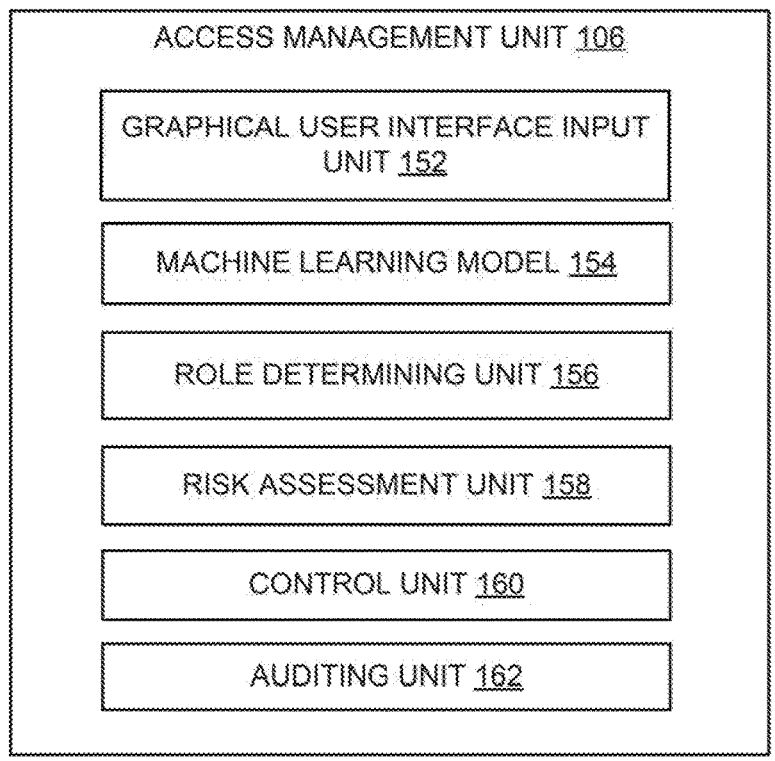
FIG. 1B is a block diagram of the example access management unit of FIG. 1A, depicting additional features.

FIG. 1B is a block diagram of example access management unit 106 of FIG. 1A, depicting additional features. For example, similarly named elements of FIG. 1B may be similar in structure and/or function to elements described with respect to FIG. 1A. Example access management unit 106 may include an input unit 152 to receive the request from a user to access enterprise system 108 through client device 102. Further, input unit 152 may obtain, via the chatbot, the user inputs by providing at least one of interactive menu-based and natural language-based queries on the graphical user interface of client device 102 in response to receiving the request. In one example, the user inputs may include at least one menu-based input and at least one natural language input. Example menu-based input may include a selection of one or more options in response to queries that are configured and defined based on a customer environment. Example natural language input may include a word or text string that may be manually entered by the user.

Further, access management unit 106 may include a machine learning model 154 to determine a transaction code and/or an authorization code corresponding to the request in enterprise system 108 by applying natural language processing on the obtained user inputs. In one example, machine learning model 154 may process the user inputs using the natural language processing to parse transaction description from the user inputs. Further, machine learning model 154 may determine the transaction code associated with the transaction description. Example transaction code may include a key that enables to access a specific transaction in enterprise system 108 corresponding to the request. In one example, machine learning model 154 may be trained to determine the transaction code based on the user inputs. Example authorization code may be used for a transaction or an entry that has restrictions on which users are entitled to access. In one example enterprise system 108 may use the transaction code or the authorization code to provide the access. In another example, enterprise system 108 may use a combination of the transaction code and the authorization code to provide the access. Example training of machine learning model 154 is described in FIG. 5.

Furthermore, access management unit 106 may include a role determining unit 156 to determine or generate a role corresponding to the transaction code and/or authorization code by accessing enterprise system 108. In one example, role determining unit 156 may determine or generate the role by making application program interface (API) based calls to enterprise system 108.

In one example, there can be multiple transaction codes and/or authorization codes corresponding to the request. In this example, there can be multiple roles corresponding to the transaction codes and/or authorization codes. In a scenario, access management unit 106 may determine the corresponding roles.

As shown in FIG. 1B, access management unit 106 may include a risk assessment unit 158 to perform the risk assessment for the user to access enterprise system 108 based on the determined role and a user profile which may include user's department, location, company code, job position in the organization, assigned roles already to the user in the enterprise system(s), usage of the enterprise system(s) in the past by the user or his/her peers, and the like. In one example, risk assessment unit 158 may determine a risk score based on the determined role, the user profile, and predefined rules (e.g. segregation of duties) associated with enterprise system 108. For example, risk assessment unit 158 may determine the risk score based on the determined role and the user profile in-line with organization's risk management policies.

Further, access management unit 106 may include a control unit 160 to control the access to enterprise system 108 based on the risk assessment and the determined role. In one example, control unit 160 may assign the role to provide the access to the user when the risk score satisfies a predetermined criterion. For example, the predetermined criterion may be based on a threshold. In this example, control unit 160 may assign the role when the risk score is less than or equal to the threshold. In another example, control unit 160 may request an approval from a system administrator to assign the role when the risk score does not satisfy the predetermined criterion. For example, control unit 160 may request the approval when the risk score is greater than the threshold. Further, control unit 160 may assign the role to the user in response to receiving the approval. In one example, where there are multiple roles, control unit 160 may assign one or more roles to the user based on the risk assessment.

Furthermore, access management unit 106 may include an auditing unit 162 to analyze the transaction logs associated with user 102 in repository 110 using a machine learning model. Further, auditing unit 162 may identify one or more risk transactions associated with user 102 accessing enterprise system 108 based on the analysis. Furthermore, auditing unit 162 may generate a report including the identified one or more risk transactions for auditing.

In some examples, the functionalities described herein, in relation to instructions to implement functions of input unit 152, machine learning model 154, role determining unit 156, risk assessment unit 158, control unit 160, auditing unit 162, and any additional instructions described herein in relation to the storage medium, may be implemented as engines or modules comprising any combination of hardware and programming to implement the functionalities of the modules or engines described herein. The functions of input unit 152, machine learning model 154, role determining unit 156, risk assessment unit 158, control unit 160, and auditing unit 162 may also be implemented by a respective processor. In examples described herein, the processor may include, for example, one processor or multiple processors included in a single device or distributed across multiple devices.

Figure 2:
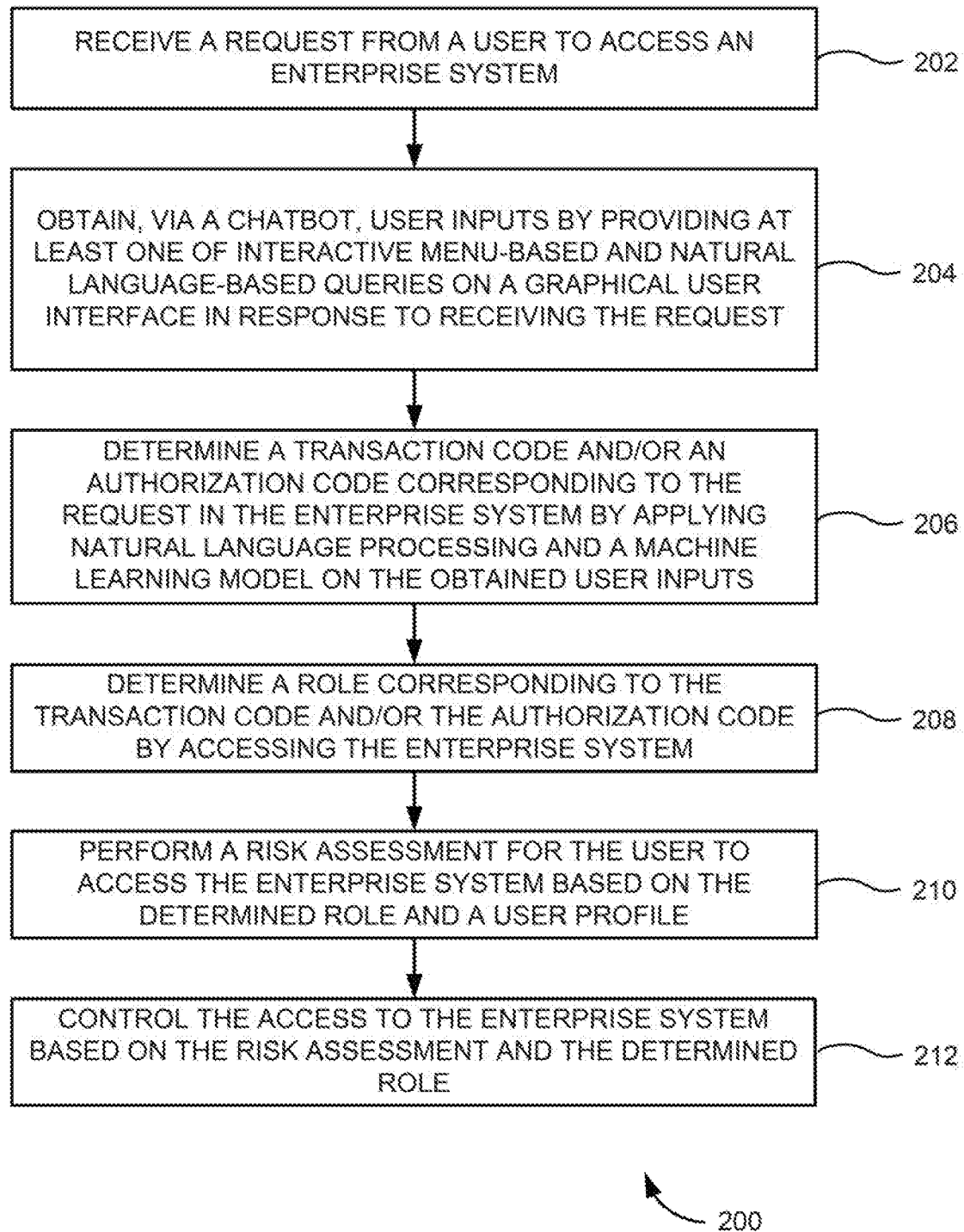
FIG. 2 is a flowchart illustrating an example method for determining a role for controlling access to an enterprise system.

FIG. 2 is a flowchart illustrating an example method 200 for determining a role for controlling access to an enterprise system. At 202, a request may be received from a user (i.e., through a client device of the user) to access the enterprise system. At 204, user inputs may be obtained, via a chatbot, by providing at least one of interactive menu-based and natural language-based queries on a graphical user interface of the client device in response to receiving the request. In one example, the user inputs may include at least one menu-based input and at least one natural language input. Example menu-based input may include a selection of one or more options in response to queries that are configured and defined based on a customer environment. Example natural language input may include a word or text string that is manually entered by the user.

At 206, a transaction code and/or an authorization corresponding to the request in the enterprise system may be determined by applying natural language processing and a machine learning model to the obtained user inputs. In one example, determining the transaction code may include processing the user inputs using the natural language processing to parse transaction description from the user inputs and determining the transaction code associated with the transaction description using the machine learning model. Example transaction code may include a key that enables to access a specific transaction in the enterprise system corresponding to the request. Example authorization code may be used for a transaction or an entry that has restrictions on which users are entitled to access.

In one example, the machine learning model may be trained to determine the transaction code and the authorization code based on the user inputs. For example, training the machine learning model may include obtaining predefined transaction codes and corresponding transaction descriptions from the enterprise system. Further, training the machine learning model may include training the machine learning model using the obtained predefined transaction codes and the corresponding transaction descriptions by preprocessing the obtained transaction codes and the corresponding transaction descriptions and applying a plurality of modelling layers to the preprocessed information. Example modelling layers may be selected from a group including an embedding layer, a masking layer, a long short-term memory layer, a dense layer, and a dropout layer. Similarly, the machine learning model may be trained to determine the authorization code or the combination of the transaction code and the authorization code. Further, the machine learning model may be retrained at regular intervals or upon determining a change in the enterprise system. Example training of the machine learning model is described in FIG. 5.

At 208, a role corresponding to the transaction code and/or authorization code may be determined by accessing the enterprise system. In one example, determining the role corresponding to the transaction code and/or the authorization code by accessing the enterprise system may include determining the role by making application program interface (API) based calls to the enterprise system. At 210, a risk assessment for the user to access the enterprise system may be performed based on the determined role and a user profile. In one example, performing the risk assessment for the user to access the enterprise system may include determining a risk score based on the determined role, the user profile, and predefined rules e.g. segregation of duties associated with the enterprise system.

At 212, the access to the enterprise system may be controlled based on the risk assessment and the determined role. In one example, controlling the access to the enterprise system may include assigning the role to provide the access to the user when the risk score satisfies a predetermined criterion. For example, the predetermined criterion may be based on a threshold. In this example, the access may be provided when the risk score is less than or equal to a threshold. In another example, controlling the access to the enterprise system may include requesting an approval from a system administrator to assign the role when the risk score does not satisfy the predefined criterion. For example, when the risk score is greater than the threshold. Further, the role may be assigned to the user in response to receiving the approval.

In one example, transaction logs may be recorded in a repository when the user requests and accesses the enterprise system. Further, the transaction logs associated with the user in the repository may be analyzed using a different machine learning model. Upon analyzing, one or more risk transactions associated with the user accessing the enterprise system may be identified based on the analysis. Furthermore, a report including the identified one or more risk transactions may be generated for auditing.

Figure 3:
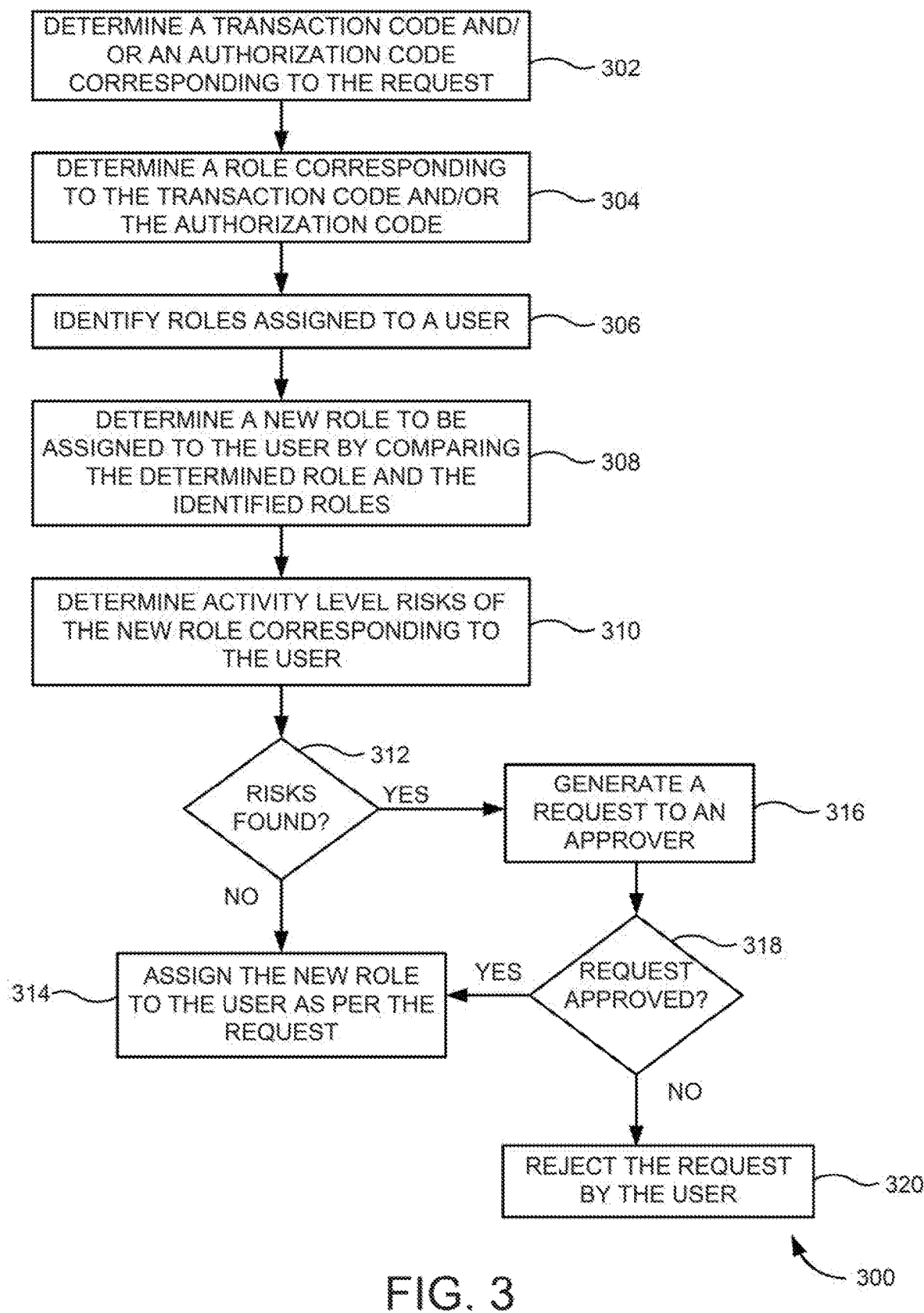
FIG. 3 is a flowchart illustrating another example method to provide an access to an enterprise system based on a request from a user.

FIG. 3 is a flowchart illustrating another example method 300 to provide an access to an enterprise based on a request from a user. At 302, a transaction code and/or an authorization code corresponding to the request is determined. In one example, the transaction code and/or the authorization code corresponding to the request in the enterprise system may be determined by applying natural language processing and a machine learning model on obtained user inputs.

At 304, a role corresponding to the transaction code and/or the authorization code may be determined by accessing the enterprise system. At 306, roles that are already assigned to the user may be identified. At 308, a new role to be assigned to the user may be determined by comparing the determined role and the identified roles.

At 310, activity level risks of the new role corresponding to the user may be determined at different levels. At first level, a check may be made to determine whether assignment of new role based on the transaction code and/or the authorization code requested will create a new risk or conflict based on segregation of duties. Next level to determine the risk is described in FIG. 4. At 312, a check is made to determine whether there are any risks found. When there are no risks found, the new role may be assigned to the user to access the enterprise system as per the request, at 314. When there is a risk found, a request may be generated and sent to a concerned person (e.g., an approver such as an administrator, a manager, or the like), at 316. At 318, a check is made to determine whether the approver has approved the request. When the approval is received, the new role may be assigned to the user to access the enterprise system as per the request, at 314. When the approval is not received, then the request by the user may be rejected, at 320. In one example, the roles (e.g., previously assigned roles and the new role) of the user may be stored in a repository and analyzed regularly. For example, when the user has not accessed a particular role in a specified duration, the user may be deallocated user from the role.

Figure 4:
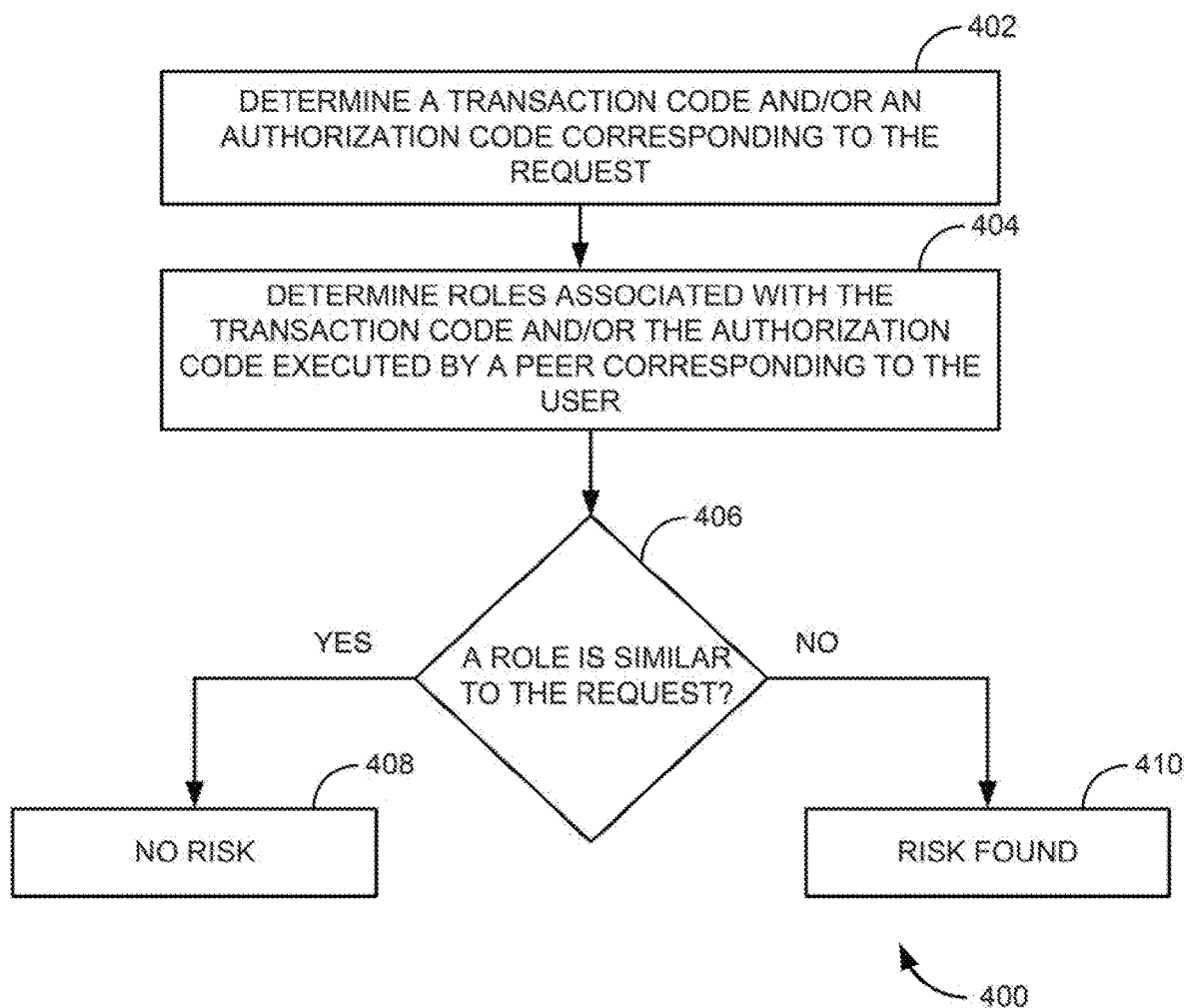
FIG. 4 is a flowchart illustrating another example method to perform risk assessment for a user to access an enterprise system.

FIG. 4 is a flowchart illustrating another example method 400 to perform risk assessment for a user to access an enterprise system. At 402, a transaction code and/or an authorization corresponding to the request in the enterprise system may be determined by applying natural language processing and a machine learning model on the obtained user inputs. At 404, one or more roles associated with the transaction code and/or the authorization code executed by a peer user may be determined. Example peer user may be a person who has equal assigned roles as that of the user in an enterprise.

At 406, a check is made to determine whether at least one role by the peer user is similar to the request. When the role is similar to the request, it may be determined that there is no risk in assigning a new role to the user to access the enterprise system as per the request, at 408. When there are no roles that is similar to the request, it may be determined at there is a risk in assigning the new role to the user to access the enterprise system as per the request, at 410. In one example, predefined and custom risk rules may be used to perform the risk assessment and risk scores may be assigned accordingly. Thus, the process of risk assessment may be automated.

Figure 5:
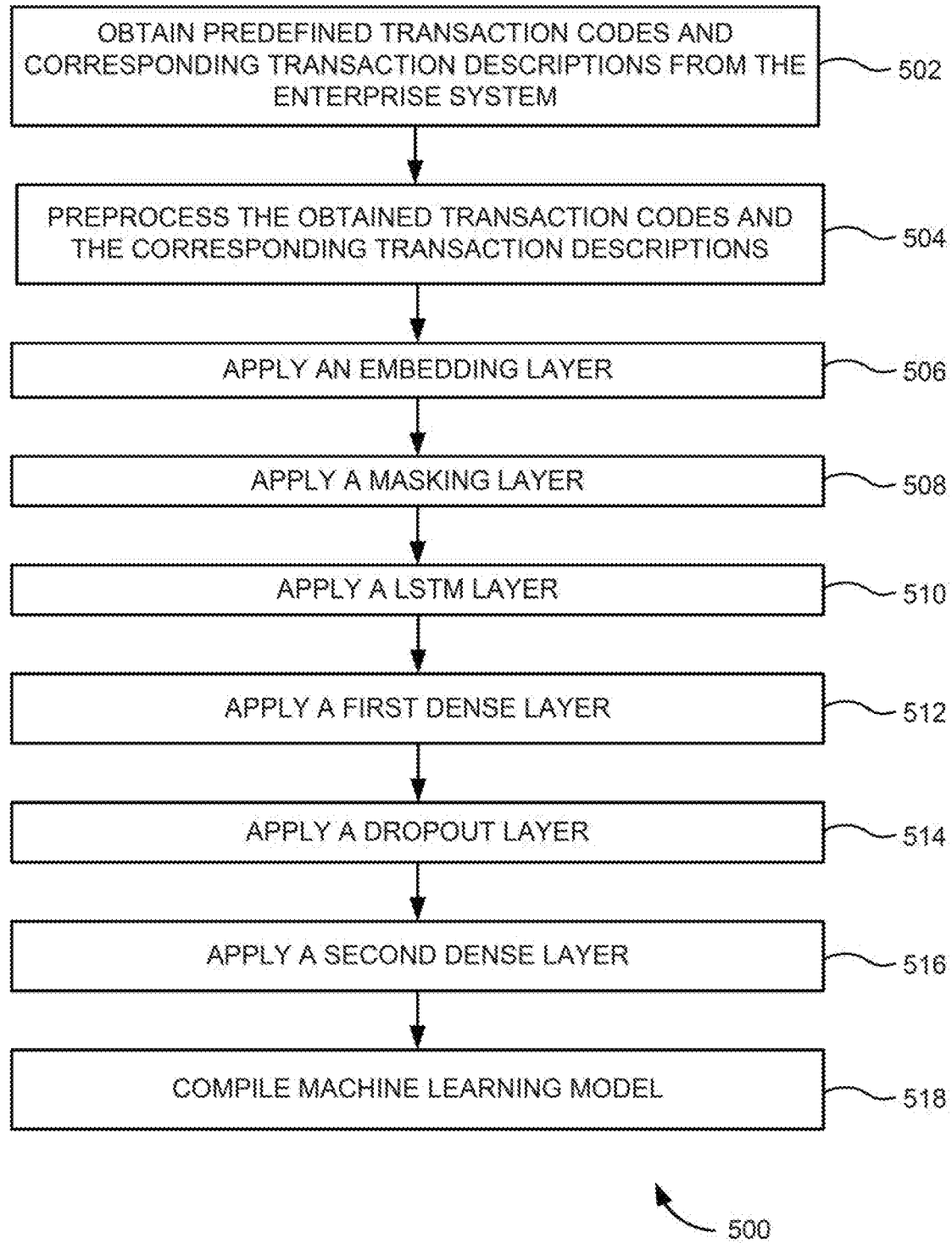
FIG. 5 is a flowchart illustrating an example method to train a machine learning model to determine a transaction code and/or an authorization code corresponding to a request.

FIG. 5 is a flowchart illustrating an example method 500 to train a machine learning model to determine a transaction code and/or an authorization code corresponding to a request. At 502, predefined transaction codes and corresponding transaction descriptions may be obtained from the enterprise system.

At 504, the obtained transaction codes and/or authorization codes and the corresponding descriptions may be preprocessed. Example preprocessing of the transaction codes may include:

determining the number transaction codes, i.e., of labels for which training is required.

building a common and unique vocabulary across input dataset. Vocabulary size (e.g., unique words from sentences) across all the transactions are assigned unique index and combination of these index in machine language map to a particular transaction code. At this point, certain words can be ignored to remove noise from the signal and improve model accuracy. For example, words such as I, want, to, please, and the like may be removed.

determining maximum words length to build a boundary constraint for user for performing the training effectively. For example, consider "i want access to create sales order" or "can you give me access to create sales order". In the example, there are 7- and 9-words length from two different sentences respectively but objective of getting transaction code is the same.

Further, definitions for the machine learning model may be defined. First, the words may be converted to vector. Further, embedding vectors for words may be identified and association using Stanford's glove dataset may be built as the dataset may include pretrained data, such as "man" and "woman". Furthermore, the dimensions of vector (e.g., 50, 100, 200, and the like) may be defined. These are called dimensional factors and play an important role in amount of time to train the model and also the accuracy of training. Thus, preprocessing the machine learning model may include saving the transaction codes (i.e., output of the machine learning model). Further, as there are large number of transaction description for each transaction code, the machine learning model may be trained using different modeling layers.

At 506-516, a plurality of modelling layers may be and applied to the preprocessed information. In one example, the plurality of modelling layers may be selected from a group consisting of an embedding layer, a masking layer, a long short-term memory layer (LSTM), a dense layer, and a dropout layer.

At 506, the embedding layer may be applied, where vocab size, dimensions of embedding input, and maximum length of input may be determined. Example input and the output corresponding to the embedding layer is as shown below.

| Embedding layer | Input | (None, 20) |
| | output | (None, 20, 100) |

At 508, the masking layer may be applied using a mask value (E.g., constant value as 0). Example masking may allow to handle variable length inputs in a recurrent neural network (RNN). Although RNNs can handle variable length inputs, they still need fixed length inputs. Therefore, a mask per sample initialized with 0 with a length equal to the longest sequence in the dataset may be generated. Example input and the output corresponding to the masking layer is as shown below.

| Masking layer | Input | (None, 20, 100) |
| | output | (None, 20, 100) |

At 510, the LSTM layer may be applied, where neural network (e.g., constant value as 128), dropout (e.g., constant value as 0.1), and recurrent dropout (e.g., constant value as 0.1) may be used. Example LSTM may be an artificial RNN model used in the field of deep learning. Further, the LSTM networks may be used to classify, process, and make predictions. Example input and the output corresponding to the masking layer is as shown below.

| LSTM layer | Input | (None, 20, 100) |
|---|---|---|
| | output | (None, 128) |

At 512, a first dense layer may be applied, where a neural network (e.g., constant value as 64) and an activation function (e.g., 'relu') may be used. Example dense layer may be used to change the dimensions of the vector. Example input and the output corresponding to the first dense layer is as shown below.

| First dense layer | Input | (None, 128) |
|---|---|---|
| | output | (None, 64) |

At 514, the dropout layer may be applied, where a dropout (e.g., constant value as 0.1) may be used. Example input and the output corresponding to the dropout layer is as shown below.

| Dropout layer | Input | (None, 64) |
|---|---|---|
| | Output | (None, 64) |

At 516, the second dense layer may be applied, wherein a number of labels and the activation function (e.g., 'softmax') may be used. Example input and the output corresponding to the dropout layer is as shown below.

| Second dense layer | Input | (None, 64) |
|---|---|---|
| | Output | (None, 38) |

At 518, the machine learning model may be compiled, where an optimizer function (e.g., Adam optimizer with learning rate as 0.001) and a loss function (e.g., "categorical_crossentropy") may be used. Further, the compiled machine learning model may be corrected using a batch size and a number of epochs. Example batch size may be a number of samples processed before the model is updated. The number of epochs may be the number of complete passes through the training dataset. Further, an epoch may be a hyperparameter which is defined before training the machine learning model. One epoch is when an entire dataset is passed both forward and backward through the neural network once. For example, when a dataset of 2000 training examples are divided into 500 batches, then 4 iterations will complete 1 epoch. Furthermore, the trained machine learning model and corresponding weights of trained dataset are stored. Similarly, the authorization codes may be processed to train the machine learning model.

Thus, training the machine learning model may include analyzing the data to determine the input and output variable. In this scenario, transaction code may be the output and transaction description may be the input. In addition to transaction code, there may be other configuration parameters as outputs depending on type of ERP system and end user requirement. Further, as the dataset is in form of human language, different ways of how organizations describe a particular transaction in their organization may be collected, i.e., a 1 to many mapping between transaction code and transaction description may be built as an input. Examples described herein may use Stanford's open source glove dataset to convert the words to vectors. Use of Stanford's gloving technique may facilitate to ensure that synonyms of words are taken care based on transaction description along with various noun and tenses. Further, the machine learning model may be trained by converting the word to vector and then assigning input and output in the form of Numpy matrixex in Python.

It should be understood that example methods 200, 300, 400, and 500 represent generalized illustrations, and that other processes may be added, or existing processes may be removed, modified, or rearranged without departing from the scope and spirit of the present application. Further, example methods 200, 300, 400, and 500 may not be intended to limit the implementation of the present application, but rather example methods 200, 300, 400, and 500 illustrate functional information to design/fabricate circuits, generate machine-readable instructions, or use a combination of hardware and machine-readable instructions to perform the illustrated processes.

Figure 6A:
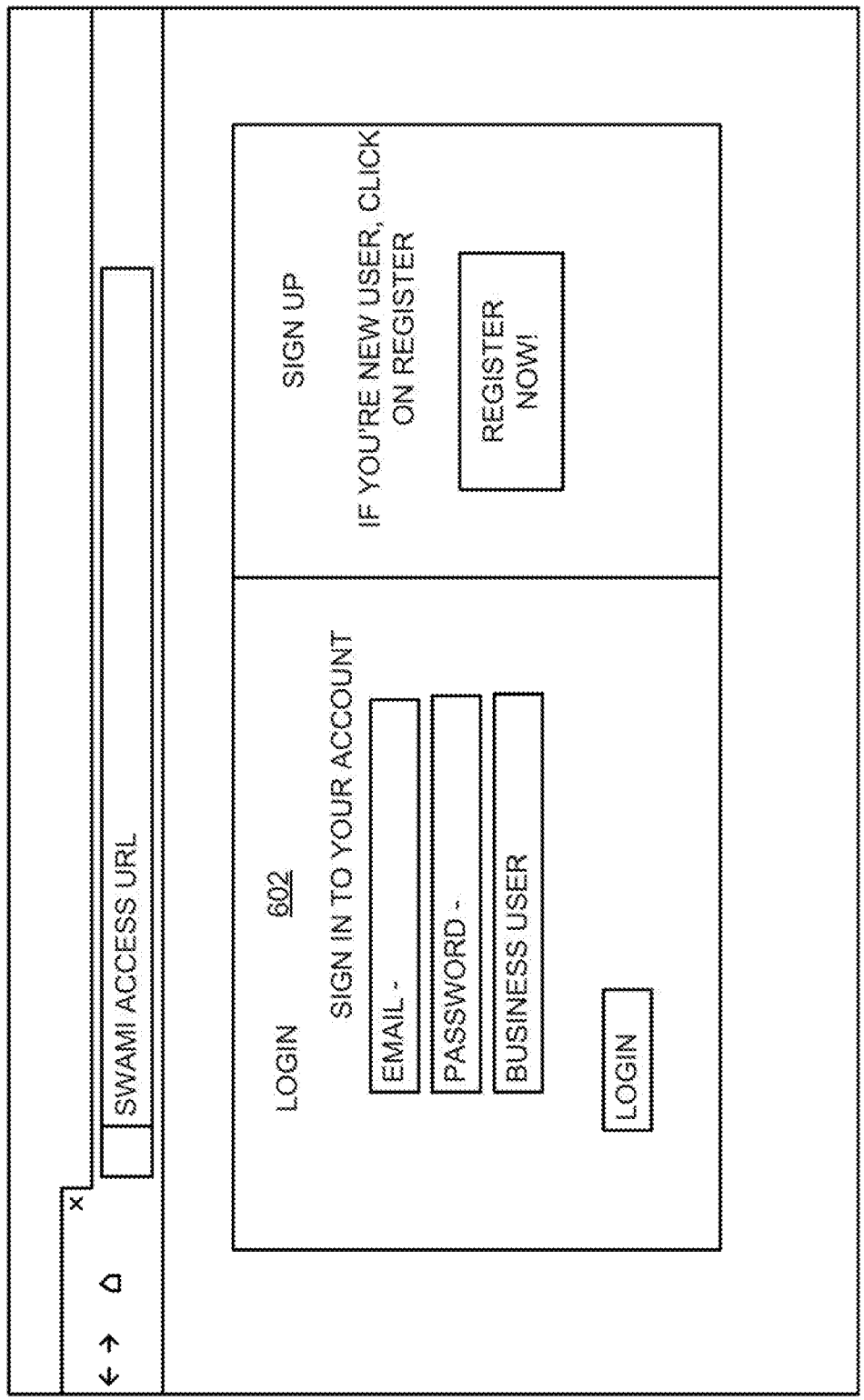
Figure 6B:
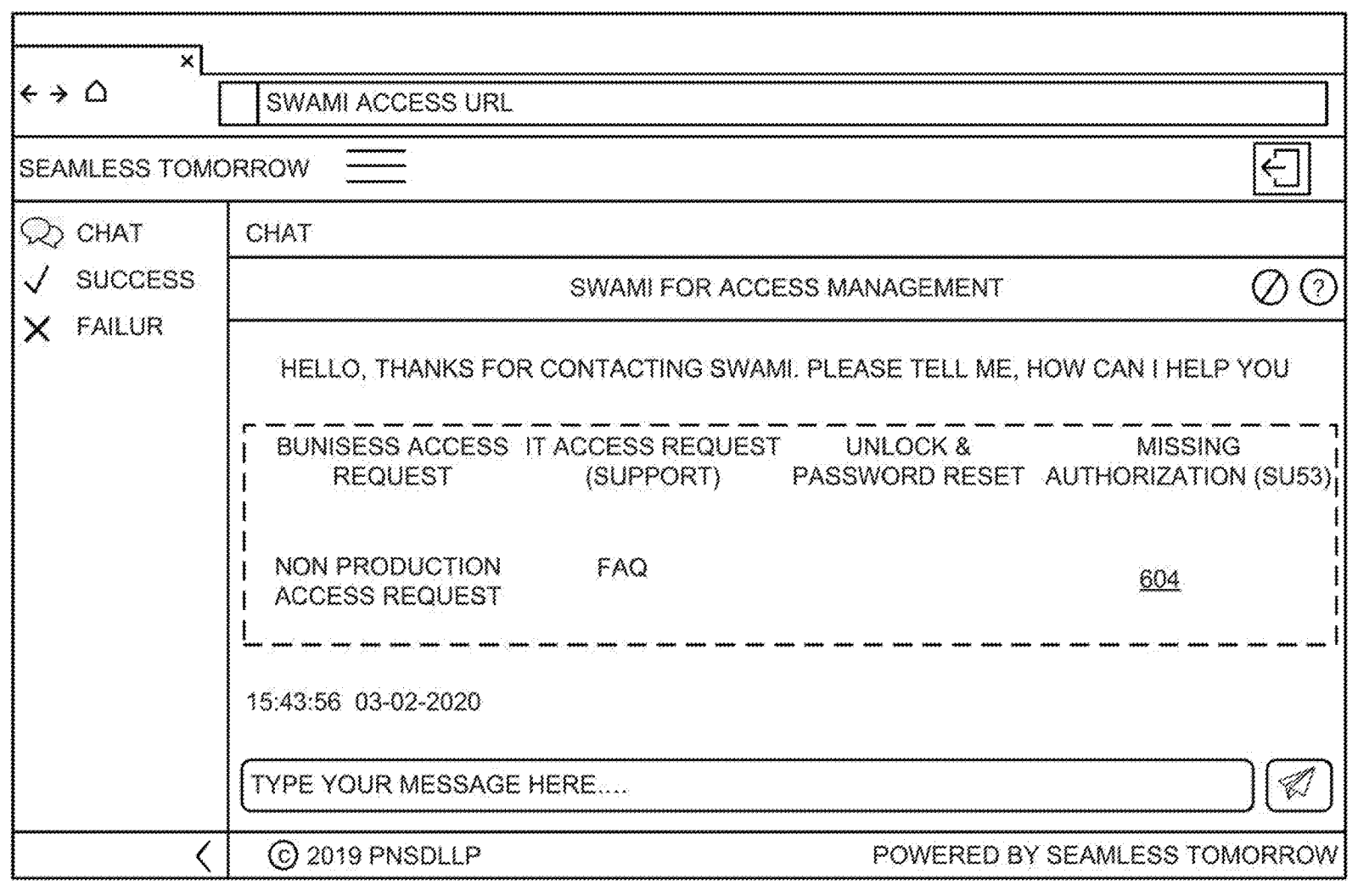
Figure 6C:
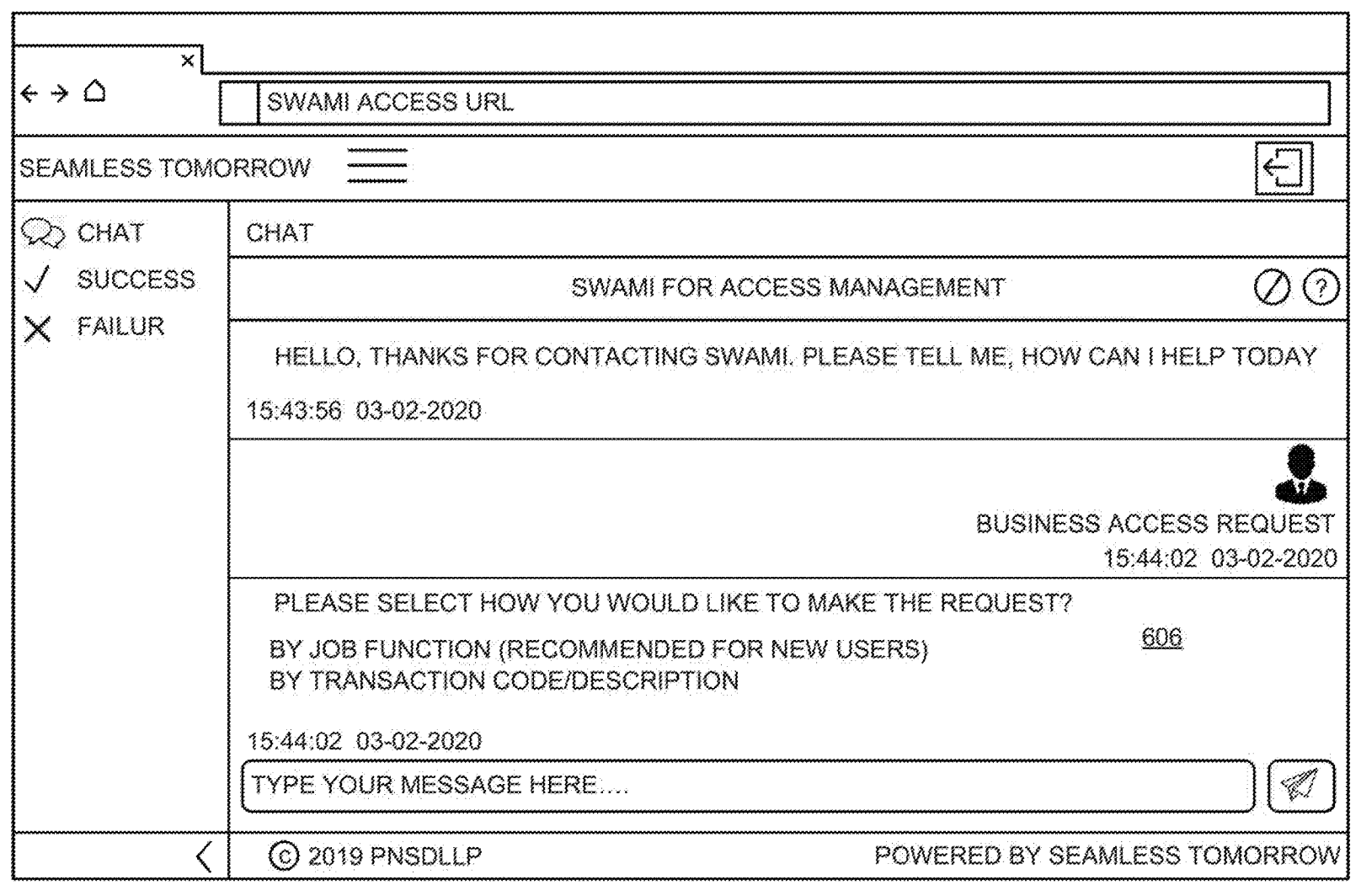
Figure 6D:
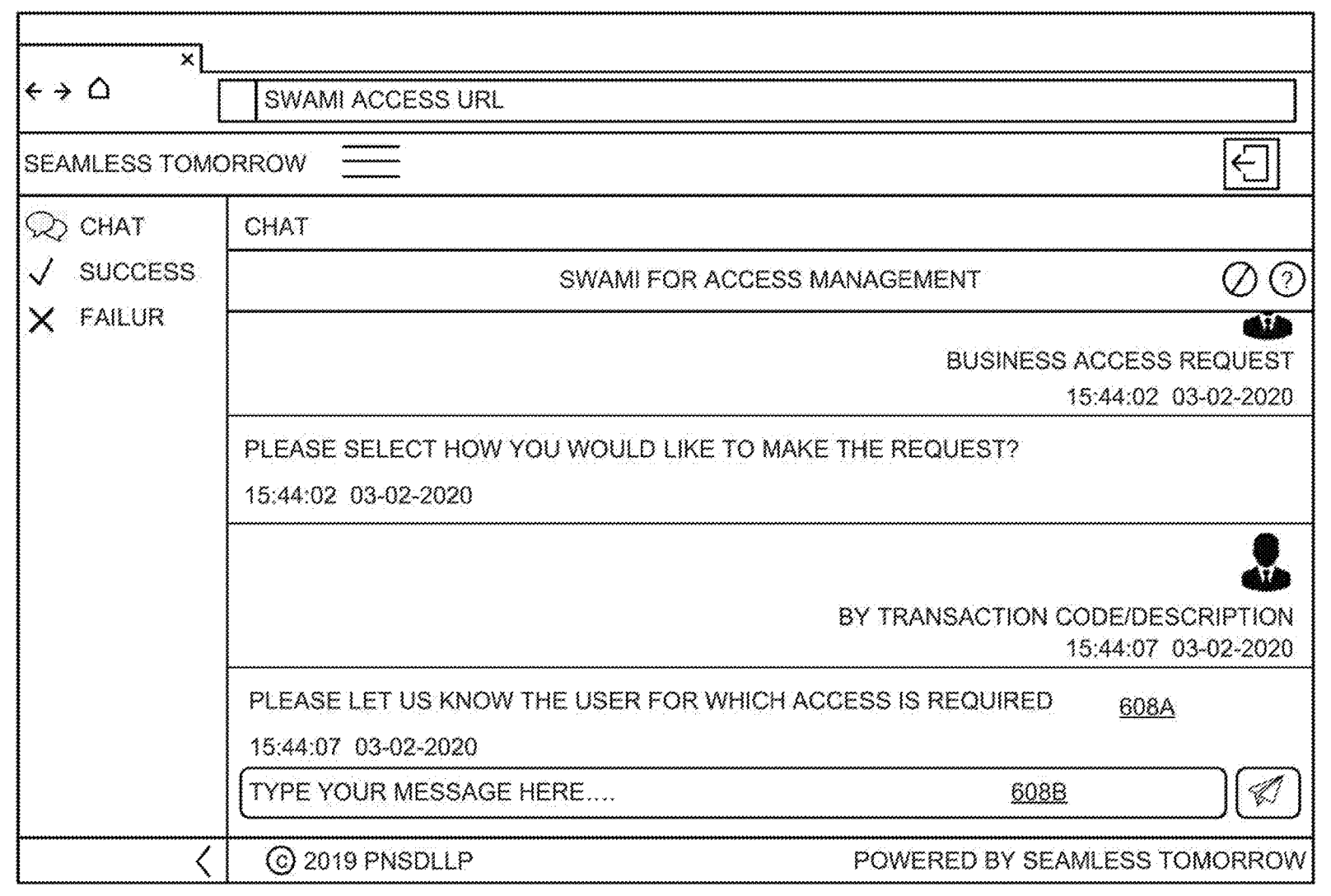
Figure 6G:
Figure 6H:

FIGS. 6A-6L depict example chatbots illustrating a combination of menu-based and natural language-based queries to obtain user inputs. In FIG. 6A, a user may log into a portal to communicate with an access management unit (e.g., 602 in FIG. 6A). In one example, the communication can be a call to a web service, where user validation is done against information stored in a database (e.g., MySQL database) and session details may be stored in another database (e.g., remote dictionary server (Redis) database).

In FIG. 6B, one or more interactive menu-based queries to be selected may be provided to the user. For example, a portion 604 may be provided to display available use cases (e.g., "business access request", "IT access request", "unlock and password reset", "missing authorization", "non production access request", and the like) for the user to select. In one example, selection of the available use cases may be a web service call and the user selection may be maintained in the MySQL database for audit trail perspective.

In FIGS. 6C-6H, multiple interactive menu-based and natural language-based queries are provided. Further, the user goes through a series of menu-based questions which can be configured and defined based on customer set up. The response for these questions can be obtained from following three places such as MySQL database, the enterprise system using OData service, and user provided inputs. The response from any of these sources is stored in a repository such as MySQL database. In FIG. 6C, a menu-based query (e.g., 606) may be provided based on the selection made in FIG. 6B (i.e., "business access request"). Further in FIG. 6D, a natural language-based query (e.g., 608A) may be provided on the graphical user interface of FIG. 6D. Further, response (e.g., natural language input 608B) for "which access is required" may be inputted by the user using the graphical user interface of FIG. 6D. In FIG. 6E, a menu-based query (e.g., 610A) may be provided on the graphical user interface and input details (e.g., either menu-based input 610B and/or natural language input 610C) regarding an enterprise system, for which access is requested may be obtained. In FIG. 6F, a menu-based query (e.g., 612) may be provided to obtain input details regarding business model corresponding to the request. Further in FIG. 6G, a next menu-based query (e.g., 614) may be provided to obtain input details regarding the activity associated with the request. Further in FIG. 6H, a natural language-based query (e.g., 616A) may be provided to obtain input request (e.g., 616B) in plain English (i.e., transaction description). This is a web service call where user inputs are translated from natural language to machine language to identify the right transaction (e.g., using a machine learning model).

Examples described herein may follow three-pronged approach to collect the data and build context about the user. The three-pronged approach may include static or constant inputs, situation driven close-ended response-based inputs, and dynamic open-ended inputs. Example constant inputs may include fact-based information which may not change for a particular user such as username, country, location, department, and the like. The constant inputs may be collected based on user login through a set of programs from existing database. Example situation driven close-ended response based inputs may be collected in a menu based option as response to close ended questions such as system name for which access is required, an environment for which access is required, duration for which access is required, business unit for which access is required, and the like. In one example, a predefined set of questions for each scenario may be set and also offers flexibility to add additional questions to collect additional information.

Example dynamic open-ended inputs is where free flowing text or natural language-based inputs may be provided, where the user can ask for anything dynamically. For example, the user can enter free flow text for such as "I want access to create sales order" or "can you give me access to create sales order" or in any other way. As the user provides the free-flowing text in plain English, a model may be built which can translate this plain English into machine understandable data. Further, a word tokenizer function from Keras library provided by python may be utilized. The free flow text entered by the user is then broken into words and each word is assigned a token. Upon assigning a token, all unique words are assigned individual index. Furthermore, to understand the tokens/words, Stanford's open source library may be used.

Figure 6I:
Figure 6J:
Figure 6K:
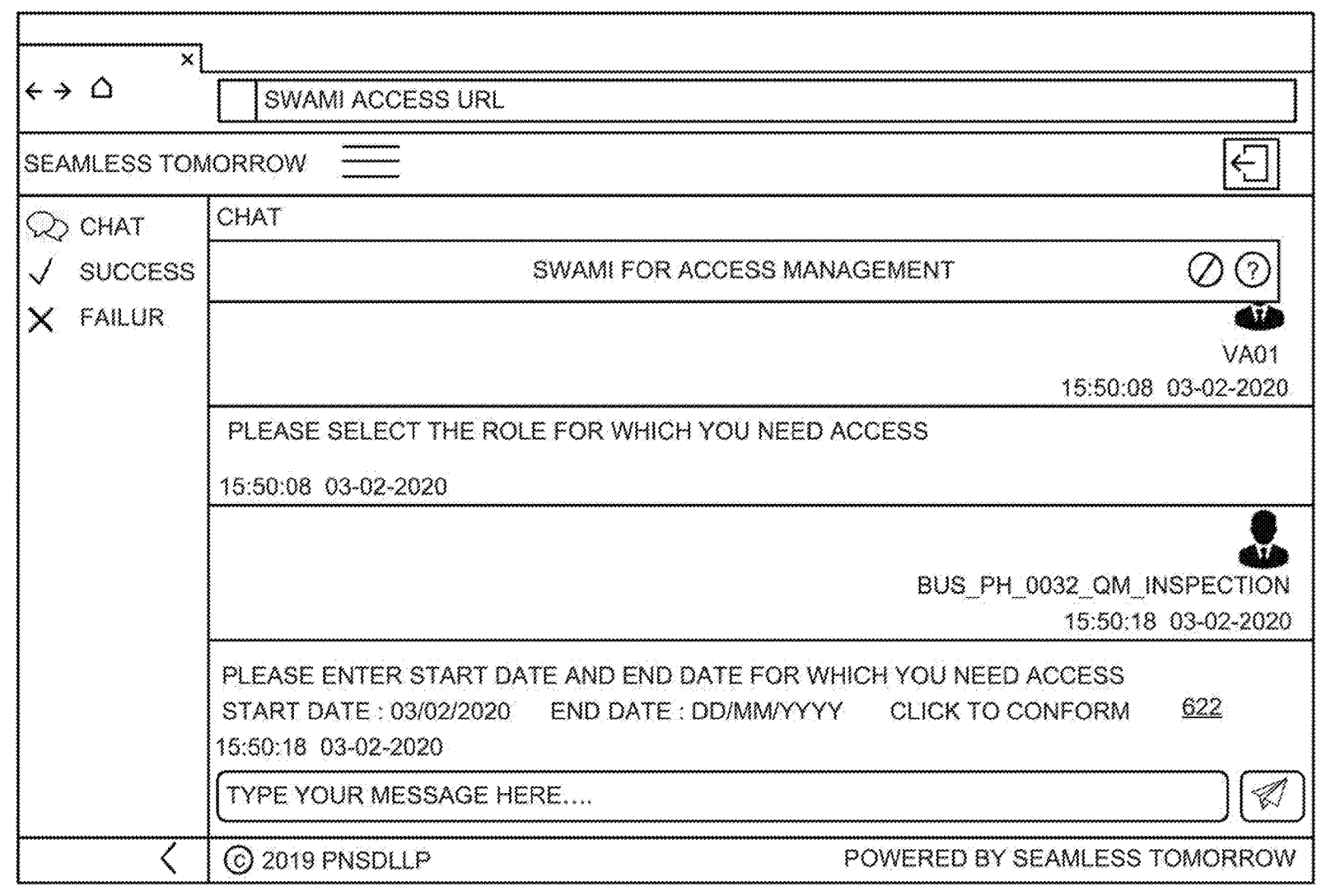

In FIG. 6I, a menu-based query (e.g., 618) may be provided to obtain input details regarding "transaction code". Further in FIG. 6J, a next query (e.g., 620) corresponding to the query in FIG. 6I may be provided to obtain selection of role of the user. In FIG. 6K, the user provides inputs related to transaction request (e.g., 622) which are required to create the request like start date, end date, reason for submission, and the like.

Figure 6L:

In FIG. 6L, user receives a message on a chat window (e.g., 624) based on response received from OData service on the access request which has been created. Thus, examples described herein may include "prove and proceed" approach to provide automated access to the enterprise system.

Figure 7:
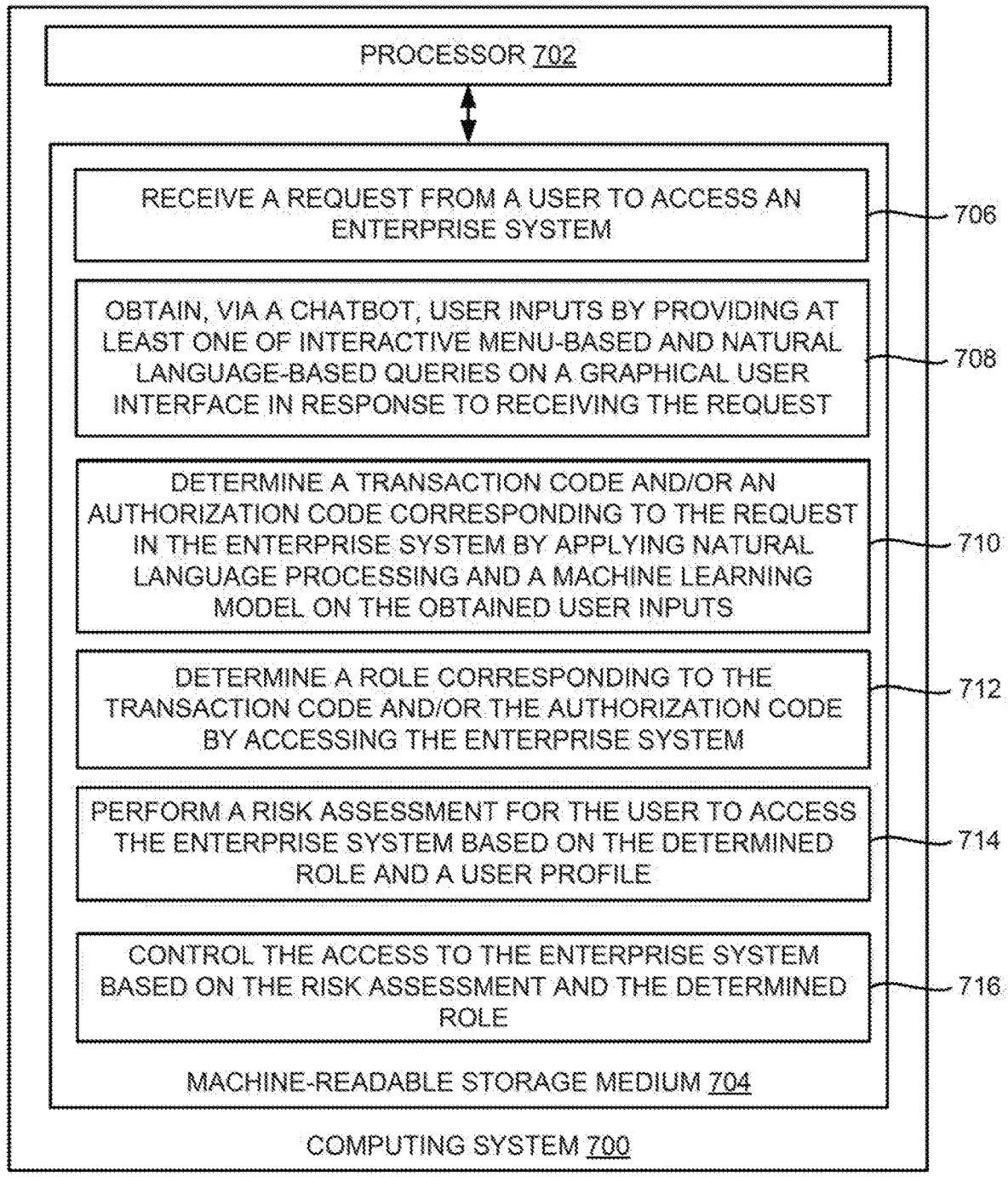
FIG. 7 is a block diagram of an example computing system including a non-transitory computer-readable storage medium, storing instructions to determine a role for controlling access to an enterprise system.

FIG. 7 is a block diagram of an example computing system 700 including non-transitory computer-readable storage medium 704, storing instructions to determine a role for controlling access to an enterprise system. Computing system 700 may include a processor 702 and machine-readable storage medium 704 communicatively coupled through a system bus. Processor 702 may be any type of central processing unit (CPU), microprocessor, or processing logic that interprets and executes machine-readable instructions stored in machine-readable storage medium 704. Machine-readable storage medium 704 may be a random-access memory (RAM) or another type of dynamic storage device that may store information and machine-readable instructions that may be executed by processor 702. For example, machine-readable storage medium 704 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 704 may be a non-transitory machine-readable medium. In an example, machine-readable storage medium 704 may be remote but accessible to computing system 700.

Machine-readable storage medium 704 may store instructions 706-716. In an example, instructions 706-716 may be executed by processor 702 to determine the role for controlling access to the enterprise system. Instructions 706 may be executed by processor 702 to receive a request from a user to access the enterprise system. Instructions 708 may be executed by processor 702 to obtain, via a chatbot, user inputs by providing at least one of interactive menu-based and natural language-based queries on a graphical user interface in response to receiving the request. In one example, the user inputs may include at least one menu-based input and at least one natural language input.

Instructions 710 may be executed by processor 702 to determine a transaction code and/or an authorization code corresponding to the request in the enterprise system by applying natural language processing and a machine learning model on the obtained user inputs. Instructions 712 may be executed by processor 702 to determine a role corresponding to the transaction code and/or authorization code by accessing the enterprise system. Instructions 714 may be executed by processor 702 to perform a risk assessment for the user to access the enterprise system based on the determined role and a user profile. Further, instructions 716 may be executed by processor 702 to control the access to the enterprise system based on the risk assessment and the determined role.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and/or any method or process so disclosed, may be combined in any combination, except combinations where at least some of such features are mutually exclusive.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A computer implemented method comprising:
receiving a request from a user to access an enterprise system;
obtaining, via a chatbot, user inputs by providing at least one of interactive menu-based and natural language-based queries on a graphical user interface in response to receiving the request, wherein the user inputs comprise at least one menu-based input and at least one natural language input;
determining a transaction code and/or an authorization code corresponding to the request in the enterprise system by applying natural language processing and a machine learning model to the obtained user inputs, wherein the machine learning model is trained to determine the transaction code and/or the authorization code based on the user inputs, and wherein training the machine learning model comprises:
obtaining predefined transaction codes and corresponding transaction descriptions from the enterprise system; and
training the machine learning model using the obtained predefined transaction codes and the corresponding transaction descriptions by preprocessing the obtained transaction codes and the corresponding transaction descriptions and applying a plurality of modelling layers to the preprocessed transaction codes and the corresponding transaction descriptions, wherein the plurality of modelling layers are selected from a group consisting of an embedding layer, a masking layer, a long short-term memory layer, a dense layer, and a dropout layer;
determining a role corresponding to the transaction code and/or the authorization code by accessing the enterprise system;
performing a risk assessment for the user to access the enterprise system based on the determined role and a user profile; and
controlling access to the enterprise system based on the risk assessment and the determined role.

2. The computer implemented method of claim 1, wherein determining the transaction code and/or the authorization code comprises:
processing the user inputs using the natural language processing to parse transaction description from the user inputs; and
determining the transaction code and/or authorization code associated with the transaction description using the machine learning model.

3. The computer implemented method of claim 1, wherein the transaction code and/or the authorization code comprises a key that enables to access a specific transaction in the enterprise system corresponding to the request.

4. The computer implemented method of claim 1, wherein determining the role corresponding to the transaction code and/or the authorization code comprises:
determining the role by making application program interface (API) based calls to the enterprise system.

5. The computer implemented method of claim 1, wherein performing the risk assessment for the user to access the enterprise system comprises:
determining a risk score based on the determined role, the user profile, and predefined rules associated with the enterprise system.

6. The computer implemented method of claim 5, wherein controlling the access to the enterprise system comprises:
assigning the role to provide access to the user when the risk score satisfies a predetermined criterion.

7. The computer implemented method of claim 6, wherein controlling the access to the enterprise system comprises:
requesting an approval from a system administrator to assign the role when the risk score does not satisfy the predetermined criterion; and
assigning the role to the user in response to receiving the approval.

8. The computer implemented method of claim 1, further comprising:
retraining the machine learning model at regular intervals or upon determining a change in the enterprise system.

9. The computer implemented method of claim 1, wherein the menu-based input comprises a selection of one or more options in response to queries that are configured and defined based on a customer environment, and wherein the natural language input comprises a word or text string that is manually entered by the user.

10. A computer implemented method comprising:
receiving a request from a user to access an enterprise system;
obtaining, via a chatbot, user inputs by providing at least one of interactive menu-based and natural language-based queries on a graphical user interface in response to receiving the request, wherein the user inputs comprise at least one menu-based input and at least one natural language input;
determining a transaction code and/or an authorization code corresponding to the request in the enterprise system by applying natural language processing and a first machine learning model to the obtained user inputs;
determining a role corresponding to the transaction code and/or the authorization code by accessing the enterprise system;
performing a risk assessment for the user to access the enterprise system based on the determined role and a user profile;
controlling access to the enterprise system based on the risk assessment and the determined role;
recording transaction logs in a repository when the user accesses the enterprise system;
analyzing the transaction logs associated with the user in the repository using a second machine learning model;
identifying one or more risk transactions associated with the user accessing the enterprise system based on the analysis; and
generating a report including the identified one or more risk transactions for auditing.

11. An access management unit comprising:
an input unit to:

receive a request from a user to access an enterprise system through a client device; and obtain, via a chatbot, user inputs by providing at least one of interactive menu-based and natural language-based queries on a graphical user interface of the client device in response to receiving the request, wherein the user inputs comprise at least one menu-based input and at least one natural language input;

a machine learning model to determine a transaction code and/or an authorization code corresponding to the request in the enterprise system by applying natural language processing to the obtained user inputs, wherein the machine learning model is trained to determine the transaction code and/or the authorization code based on the user inputs, and wherein training the machine learning model comprises:

obtaining predefined transaction codes and corresponding transaction descriptions from the enterprise system; and training the machine learning model using the obtained predefined transaction codes and the corresponding transaction descriptions by preprocessing the obtained transaction codes and the corresponding transaction descriptions and applying a plurality of modelling layers to the preprocessed transaction codes and the corresponding transaction descriptions, wherein the plurality of modelling layers are selected from a group consisting of an embedding layer, a masking layer, a long short-term memory layer, a dense layer, and a dropout layer;

a role determining unit to determine a role corresponding to the transaction code and/or authorization code by accessing the enterprise system;

a risk assessment unit to perform a risk assessment for the user to access the enterprise system based on the determined role and a user profile; and a control unit to control the access to the enterprise system based on the risk assessment and the determined role.

12. The access management unit of claim 11, wherein the machine learning model is to:

process the user inputs using the natural language processing to parse transaction description from the user inputs; and determine the transaction code and/or the authorization code associated with the transaction description.

13. The access management unit of claim 11, wherein the role determining unit is to determine the role by making application program interface (API) based calls to the enterprise system.

14. The access management unit of claim 11, wherein the risk assessment unit is to determine a risk score based on the determined role, the user profile, and predefined rules associated with the enterprise system.

15. An access management unit comprising:

an input unit to:

receive a request from a user to access an enterprise system through a client device; and obtain, via a chatbot, user inputs by providing at least one of interactive menu-based and natural language-based queries on a graphical user interface of the client device in response to receiving the request, wherein the user inputs comprise at least one menu-based input and at least one natural language input;

a first machine learning model to determine a transaction code and/or an authorization code corresponding to the request in the enterprise system by applying natural language processing to the obtained user inputs;

a role determining unit to determine a role corresponding to the transaction code and/or authorization code by accessing the enterprise system;

a risk assessment unit to perform a risk assessment for the user to access the enterprise system based on the determined role and a user profile;

a control unit to control the access to the enterprise system based on the risk assessment and the determined role;

a repository to record transaction logs when the user accesses the enterprise system; and an auditing unit to:

analyze the transaction logs associated with the user in the repository using a second machine learning model;

identify one or more risk transactions associated with the user accessing the enterprise system based on the analysis; and generate a report including the identified one or more risk transactions for auditing.

16. A non-transitory machine-readable storage medium encoded with instructions that, when executed by a computer, cause the computer to:

receive a request from a user to access an enterprise system;

obtain, via a chatbot, user inputs by providing at least one of interactive menu-based and natural language-based queries on a graphical user interface in response to receiving the request, wherein the user inputs comprise at least one menu-based input and at least one natural language input;

determine a transaction code and/or an authorization code corresponding to the request in the enterprise system by applying natural language processing and a machine learning model to the obtained user inputs, wherein the machine learning model is trained to determine the transaction code and/or the authorization code based on the user inputs, and wherein instructions to train the machine learning model comprise instructions to:

obtain predefined transaction codes and corresponding transaction descriptions from the enterprise system; and train the machine learning model using the obtained predefined transaction codes and the corresponding transaction descriptions by preprocessing the obtained transaction codes and the corresponding transaction descriptions and applying a plurality of modelling layers to the preprocessed transaction codes and the corresponding transaction descriptions, wherein the plurality of modelling layers are selected from a group consisting of an embedding layer, a masking layer, a long short-term memory layer, a dense layer, and a dropout layer;

determine a role corresponding to the transaction code and/or the authorization code by accessing the enterprise system;

perform a risk assessment for the user to access the enterprise system based on the determined role and a user profile; and control the access to the enterprise system based on the risk assessment and the determined role.

17. The non-transitory machine-readable storage medium of claim 16, wherein instructions to determine the transaction code and/or the authorization code comprise instructions to:

process the user inputs using the natural language processing to parse transaction description from the user inputs; and determine the transaction code and/or the authorization code associated with the transaction description using the machine learning model.

18. The non-transitory machine-readable storage medium of claim 16, wherein instructions to determine the role corresponding to the transaction code and/or the authorization code by accessing the enterprise system comprise instructions to determine the role by making application program interface (API) based calls to the enterprise system.

19. The non-transitory machine-readable storage medium of claim 16, wherein instructions to perform the risk assessment for the user to access the enterprise system comprise instructions to:
  determine a risk score based on the determined role, the user profile, and predefined rules associated with the enterprise system.

20. A non-transitory machine-readable storage medium encoded with instructions that, when executed by a computer, cause the computer to:
  receive a request from a user to access an enterprise system;
  obtain, via a chatbot, user inputs by providing at least one of interactive menu-based and natural language-based queries on a graphical user interface in response to receiving the request, wherein the user inputs comprise at least one menu-based input and at least one natural language input;
  determine a transaction code and/or an authorization code corresponding to the request in the enterprise system by applying natural language processing and a first machine learning model to the obtained user inputs:
  determine a role corresponding to the transaction code and/or the authorization code by accessing the enterprise system;
  perform a risk assessment for the user to access the enterprise system based on the determined role and a user profile;
  control the access to the enterprise system based on the risk assessment and the determined role;
  record transaction logs in a repository when the user accesses the enterprise system;
  analyze the transaction logs associated with the user in the repository using a second machine learning model;
  identify one or more risk transactions associated with the user accessing the enterprise system based on the analysis; and
  generate a report including the identified one or more risk transactions for auditing.

* * * * *